No. 793,116. PATENTED JUNE 27, 1905.
T. R. WEYANT.
WEIGHING APPARATUS.
APPLICATION FILED APR. 3, 1901.
3 SHEETS—SHEET 3.
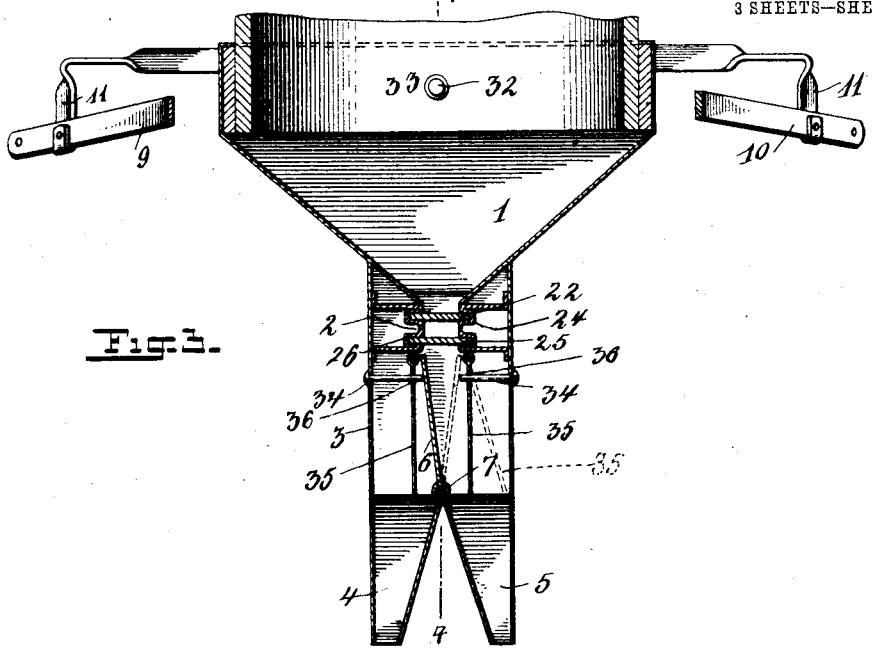
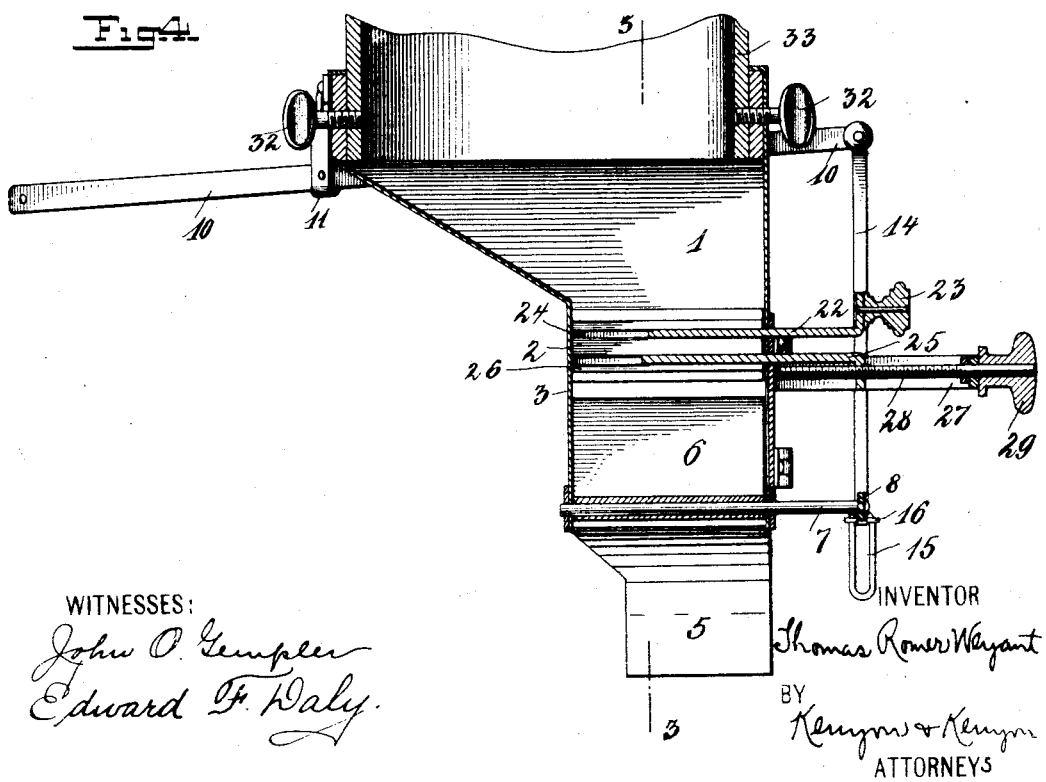
WITNESSES:
John O. Gempler
Edward F. Daly.
INVENTOR
Thomas Romer Weyant
BY
Kenyon & Kenyon
ATTORNEYS No. 793,116.                                           Patented June 27, 1905.

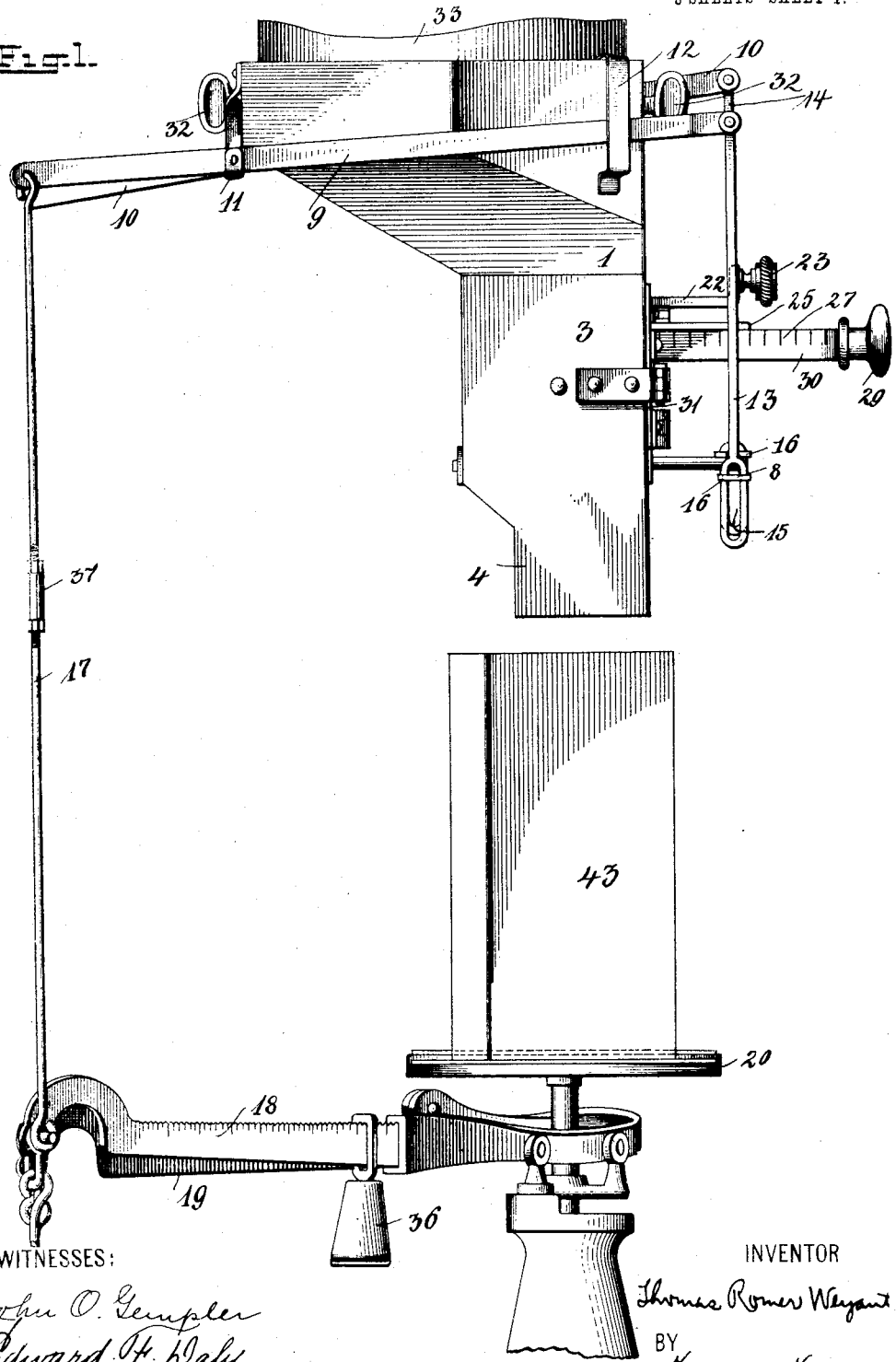

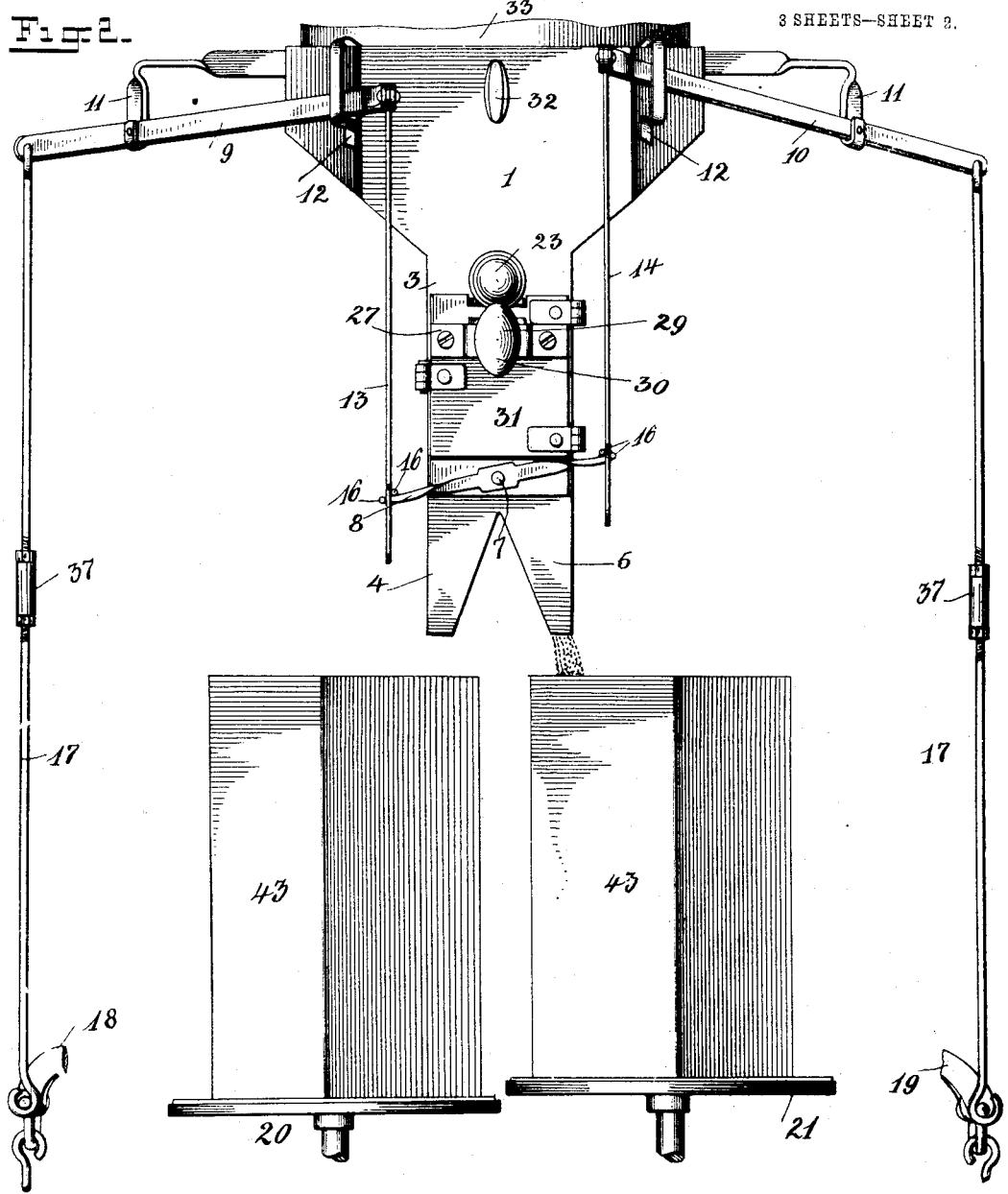

UNITED STATES PATENT OFFICE.

THOMAS ROMER WEYANT, OF BROOKLYN, NEW YORK, ASSIGNOR TO U. S. AUTOMATIC WEIGHING MACHINE CO., A CORPORATION OF MAINE.

WEIGHING APPARATUS.

SPECIFICATION forming part of Letters Patent No. 793,116, dated June 27, 1905.

Application filed April 3, 1901. Serial No. 54,131.

*To all whom it may concern:*

Be it known that I, THOMAS ROMER WEYANT, a citizen of the United States, and a resident of Brooklyn, in the county of Kings, city of New York, and State of New York, have invented new and useful Improvements in Weighing Apparatus, of which the following is a specification.

My invention relates to attachments for scales whereby different kinds of grains, powders, and similar substances may be automatically weighed.

The principal object of my invention is to provide such a scale attachment that the delivery of the substance to the scales may be constant and unobstructed and the weighing of the same very rapid.

In the drawings I have shown one embodiment of my invention, in which—

Figure 1 is a front elevation. Fig. 2 is a side elevation showing the invention as applied to two scales. Fig. 3 is a vertical section through the line 3 3 of Fig. 4. Fig. 4 is a similar section through the line 4 4 of Fig. 3. Fig. 5 is a detail of a modification showing the application of my invention to an ordinary grocer's scale having an ordinary weight-pan for receiving removable weights.

Similar numbers represent like parts in all the figures.

1 is a hopper having a downwardly-extending contracted part 2. This part 2 is inclosed in a casing 3, which extends below the part 2 and terminates in a plurality (preferably two) of diverging chutes 4 and 5.

6 is a valve extending across the inside of the casing 3 from front to rear and secured at its lower end to a rock-shaft 7, which extends through the front of the casing 3.

8 is a cross-bar secured to the shaft 7 outside of the casing 3.

9 and 10 are levers pivoted to brackets 11, extending from either side of the hopper 1, and 12 represents vertical guides through which the forward arms of said levers pass.

13 and 14 are connecting-rods, the upper ends of which are pivoted, respectively, to the forward arms of the levers 9 and 10. The lower ends of the two rods 13 and 14 are provided with vertical slots 15, through which the respective arms of the cross-bar 8 pass, cross guide-pins 16 being provided on the cross-bar and arranged on both sides of the connecting-rods to prevent said rods from sliding along the cross-bar longitudinally and to keep them in their proper positions relative to the cross-bar.

The rear arms of the levers 9 10 are provided with connections (preferably connecting-rods) 17 for respectively connecting said arms with the beams of weighing-scales. I have shown in Fig. 2 levers 9 and 10 and portions of two scales, with the beam 18 of one scale loosely connected with the lower end of one connecting-rod 17 and the beam 19 behind the beam 18, the connection for attachment to said beam not being shown, as it is directly behind the connecting-rod 17, which is connected to the beam 18. In Fig. 2 both connecting-rods 17 are shown connected to their appropriate beams 18 and 19; but the rest of the scale, except the receiving parts of the same, are omitted, as the operation is otherwise plainly shown in both of said figures. The receiver or receiving-tray 20, forming part of the scale having the beam 18, is situated under the mouth of the chute 4, and the receiving-tray 21, belonging to the scale having the beam 19, is situated under the mouth of the chute 5.

22 is an ordinary sliding gate, passing through an opening in the front of the casing 3 and adapted to open and close the contracted portion 2 of the hopper 1. This gate is provided with a handle 23, by which the same may be operated, and the gate itself slides in grooved bearings 24, as clearly shown in Fig. 3.

25 is an adjustable gate, also sliding in groove-guides 26.

Extending out from the front of the casing 3 and to the side of and in front of the gate 25 is a bracket 27, which supports a screw 28, said screw passing through the front of said bracket and having rotary but not longitudinal movement therein. Said screw passes through a screw-threaded opening in a vertical projection in the front of the gate 25, so that when said screw 28 is rotated by its handle 29 the gate will slide either forward or backward in the guides 26. The side of the bracket 27 is preferably marked off to form a gage to indicate the proper adjustment of the passage of different kinds of grains or other substances, as shown at 30, Fig. 1, in such manner that when the front end or edge of the gate 25 registers with the different marks 30 the gate will be open or closed just the proper distance to permit of the free and proper delivery of the grain or other substance through the outlet of the hopper 1 into the different chutes.

The front of the casing 3 is made in the form of a door 31 to enable the valve 6 and passage-way between the hopper and the chutes to be gotten at to clean the interior of the apparatus to remove possible obstructions or for any other purpose.

The top of the hopper 1 is also provided with binding-screws 32, extending transversely through the walls of the same, whereby the lower end of any ordinary hopper or chute 33 may be firmly secured to said hopper 1.

34 represents two stop-pins extending inward from the walls of the casing 3 to a point about in a vertical line below the wall of the contracted portion 2 of the hopper 1. These stop-pins 34 limit the play of the valve 6 in either direction and form rests for said valve when it drops first to one side and then to the other and prevent the valve from dropping or being turned beyond the contracted passage of the hopper 1 and also prevent too much play of the cross-bar 8, and consequently of the levers 9 and 10 and the beams 18 and 19.

35 35 (see Fig. 3) are curtains pivoted or otherwise suspended below the contracted part 2 of the hopper 1 and extending across the casing 3 above the chutes 4 and 5 from front to back. These curtains, together with the valve 6, serve as guides from said contracted passage to the chutes, respectively, for the down-flowing grain or other substance, which substance is partly deflected from the valve 6 against the curtain over the opened chute and by said curtain down said chute. The curtains 35, with the valve 6, virtually constitute continuations of the contracted part of the hopper 1 to the respective chutes when grain or other substance is passing through the same. When the valve is in the position shown in Fig. 3, the pressure of the down-flowing grain will force the curtain 35 that is over the chute 5 to the position shown in dotted lines in Fig. 3, with its lower edge against the wall of the casing 3. The opposite curtain 35 acts as a screen to prevent any loose particles of the falling substance that might have passed the valve 6 from getting into the chute closed by said valve. The curtains 35 are provided with slots 36, through which the stop-pins 34 pass, to enable the curtains to swing from side to side.

To enable the connecting-rods 17 to be accurately adjusted in regard to their length, said rods may be made in two parts, as shown in Figs. 1 and 2, with the adjacent ends of said parts screw-threaded and united by a screw turnbuckle 37.

In Fig. 5 I have shown the lower end of the connecting-rod 17 applied to a form of scale which has a tray for holding loose weights at the opposite end of the beam from the receiving-pan. In this case I prefer to screw-thread the lower end of the rod 17 and secure it to the tray 38 by passing the rod through said tray and securing it thereon by nuts 39. In this case the tray 38 is pivoted to the balance-beam proper, 40, and a separate scale-beam 41, provided with a hanging weight 42, is secured to the side of said beam 40.

In the above-described construction the rod 17 is connected with the balance-beam of the scale, but indirectly through the tray 38, while in the construction shown in the other figures the rod 17 is directly connected with the balance-beam.

The operation of the apparatus is as follows: The top of the chute 1 and the lower end of a hopper or chute 33 are secured together by the binding-screws 32, the end of the chute 33 being inserted within the hopper 1. The lower ends of the chutes 4 and 5 should also be above the receiving-pans 20 and 21 of two scales. Suppose it now be desired to fill a numerous lot of packages or cartons with five pounds each of rice. The adjustable gate 25 is then slid until the front end of the same registers with the mark on the bracket 27 indicating rice and the upper gate 22 is pushed in, so as to close the delivery-opening of the chute 1. As much rice as can be contained in the hopper or chute 33 is then dumped into the same, and cartons or bags 43 are then placed on the receiving-pans 20 and 21 with the openings of said cartons under the outlet-openings of the chutes 4 and 5. The weight 36 on each of the beams 18 and 19 is moved on said beams, respectively, over the mark indicating "five pounds," so that it will require a weight of five pounds on each of the pans to overbalance the weights and raise the backward ends of said beams. The cross-bar 8 is then turned so as to close the entrance to one of the chutes, say 4, and open that to the other chute, say 5. Then the gate 22 is pulled out, so as to leave a free passage for the rice from the hoppers 33 and 1 to the chutes. The rice will immediately begin to fall through the contracted portion 2 of the hopper to and through the chute 5 (the valve 6 and curtain 35 over said chute guiding and deflecting the rice, as above described) into the mouth of the carton 43 on the tray 21. As soon as this begins to take place the operator should take his hand from the cross-bar 8, thus allowing the remainder of the operation to be automatic. The rice will fall into the carton 43 until it contains five pounds, when the tray 21 will drop, counterbalancing the weight 36, and in doing so will raise the beam 19 and the rear arm of lever 10, and consequently lower the front arm of said lever and the rod 14, drawing down the right arm of the cross-bar 8 and turning the valve 6 to close the entrance to the chute 5, shutting off the flow of rice through said chute. By turning the valve 6 to close the chute 5 the entrance to the chute 4 is opened, when the rice will begin to fall through the chute into the carton 43 on the tray 20. As soon as said carton has begun to be filled the one which is on the tray 21 and which has already been filled should be removed and an empty carton replaced on said tray. The rice continues to run into the carton on the tray 20 until said carton has received five pounds of the rice, when the tray 20 will drop, counterbalancing the weight 36 on the beam 18, so that said beam will rise and carry with it the rod 17 and the rear arm of the lever 9, and consequently force the front arm of said lever and the connecting-rod 13 down, thus bearing down the left arm of the cross-bar 8 and turning the valve 6, so as to close the entrance to the chute 4 and open the entrance to the chute 5, so that the flow of the rice will be shut off through the chute 4 and be made to pass through the chute 5 into the empty carton on the tray 21. The position of the parts just described will be as shown in Fig. 2, the carton on the tray 20 being full and the carton on the tray 21 being filled. The rice will fall through the chute 5 until the carton 43 on the tray 21 has received five pounds of the rice, when the previous action will be repeated. It will only be necessary for the attendant of the apparatus to remove the cartons as soon as the trays upon which they rest have been depressed and to replace them by empty cartons. In this manner the carton on one tray will be filling between the time that the carton on the other tray is filled and an empty carton placed thereon. The operation would be so rapid that one carton will be filled almost in the time that it would take the attendant to remove the filled carton and replace it by an empty one. Even if the apparatus had or used only one chute the substance could be alternately fed to and weighed upon one scale, for as soon as the necessary weight of the substance had dropped upon the receiving-pan the beam and lever would be counterbalanced and close the chute by the valve. Then when the substance was removed from the receiving-tray the weight on the beam would return the parts to their former positions, the valve opening the chute and again permitting the flow of the substance through the chute.

From the above it will be seen that my invention is a very simple and inexpensive one and one that can be applied to any scales. Also, which is a most important consideration, it is not necessary to have a skilled attendant to look after the weighing of the different substances, as any one of ordinary intelligence who knows enough to remove and replace the cartons at the proper time can do all that is required, the apparatus doing the rest.

A still further important feature of my invention is that the grain or other substance has a free passage and is not restrained within a receiver or receptacle, as the material passes freely through the lower ends of the chutes at all times when their inlet ends are open. One of the greatest objections to automatic weighing-machines heretofore used is that the lower ends of the chutes are kept closed until a sufficient amount of material has filled said chutes to cause the device to operate. On this account the walls of the chutes offer a resistance to the free flow of the material, especially if it be damp, and will cause it to adhere to the sides of the chutes and thus block the passage through the same.

What I claim as new, and desire to secure by Letters Patent, is—

1. The combination with two beam-scales, of an automatic weighing attachment comprising a hopper terminating in two chutes arranged for delivering into the two respective scale-pans, but unconnected therewith, a valve constructed to alternately control the passage of said chutes respectively, and the arm of each beam opposite its scale-pan connected with said valve by independent operative mechanism.

2. The combination with two beam-scales, of an automatic weighing attachment comprising a hopper terminating in two chutes arranged for delivering into the two respective scale-pans, but unconnected therewith, a valve constructed to alternately control the passage of said chutes respectively, and the arm of each beam opposite its scale-pan connected with said valve by independent operative mechanism, and parts of said mechanism having play relatively to each other.

3. An automatic attachment for weighing-scales, consisting of a chute adapted to be placed for delivering its contents into a receiving device of a scale but unconnected therewith, a rocking valve adapted to alternately open and close said chute, a rock-bar connected with said valve and arranged to rock with the same, a lever having one arm connected with the rock-bar, and the other arm of said lever constructed to be connected with the weight-arm of the scale which is opposite that of the receiving device, whereby the rocking of said bar will cause the valve to open and close the chute, and whereby the delivery into the receiving device of a material of sufficient weight to counterbalance the weighted arm of the scale will cause the same to rise and through the lever and rock-bar move the valve to close the chute, and thus shut off the delivery to the receiving device.

4. An automatic attachment for weighing-scales, consisting of a chute adapted to be placed for delivering its contents into a receiving device of a scale, but unconnected therewith, a rocking valve adapted to alternately open and close said chute, a rock-bar connected with said valve and arranged to rock with the same, a lever, a connecting member between one arm of said lever and said bar, and said member having means at the connection with the bar for permitting play one with the other, and the other arm of said lever constructed to be connected with the weight-arm of the scale which is opposite that of the receiving device, whereby the rocking of said bar will cause the valve to open and close the chute, and whereby the delivery into the receiving device of a material of sufficient weight to counterbalance the weighted arm of the scale will cause the same to rise and through the lever and rock-bar move the valve to close the chute, and thus shut off the delivery to the receiving device.

5. An automatic attachment for weighing-scales, consisting of a chute adapted to be placed for delivering its contents into a receiving device of a scale but unconnected therewith, a rocking valve adapted to alternately open and close said chute, a rock-bar connected with said valve and arranged to rock with the same, a lever, a connecting-rod between one arm of the lever and said bar, and said rod having a slot through which the arm of said bar passes for permitting play between said bar and rod, and the other arm of said lever constructed to be connected with the weight-arm of the scale which is opposite that of the receiving device, whereby the rocking of said bar will cause the valve to open and close the chute, and whereby the delivery into the receiving device of a material of sufficient weight to counterbalance the weighted arm of the scale will cause the same to rise and through the lever and rock-bar move the valve to close the chute, and thus shut off the delivery to the receiving device.

6. An automatic attachment for weighing-scales, consisting of a hopper terminating at its lower end in a plurality of diverging chutes adapted to be placed for delivering their contents into receiving devices of scales, but unconnected with said devices, a rocking valve adapted to alternately open and close the inlets of said chutes, a rock-bar connected with said valve and arranged to rock with the same, levers respectively having one arm connected with the rock-bar, and the other arm of said respective levers constructed to be connected with the weight-arm of the respective scales, which is opposite that of the receiving device, whereby the raising of an arm of the rock-bar will move the valve to open the inlet of the chute corresponding with said arm, and the depression of one arm of the rock-bar by the receiving connection will move the valve to close the inlet of the corresponding chute, all as and for the purposes set forth.

7. An automatic weighing attachment for scales consisting of a hopper terminating at its lower end in two diverging chutes, a rocking valve adapted to alternately open and close the upper ends or inlets of said chutes, a cross-bar connected with said valve and adapted to rock with the same, two levers respectively connected by one arm with the two arms of the cross-bar, and the other arm of said levers connected respectively with the balance-beams of two scales, whereby the raising of one arm of the cross-bar will move the valve to open the chute corresponding with said arm, and the depression of one arm of the said cross-bar by the receiver connection will move the valve to close the inlet of the corresponding chute.

8. An automatic weighing attachment for scales consisting of a hopper terminating at its lower end in two diverging chutes, a rocking valve adapted to alternately open and close the upper ends or inlets of said chutes, means for limiting the movement of the rocking valve in either direction, a cross-bar connected with said valve and adapted to rock with the same, two levers, and a connecting member between one arm of each of said levers and an arm of the cross-bar, and said members having means at the connection with the cross-bar for permitting play one with the other, and the other arm of said levers connected respectively with the balance-beams of the two scales, all as and for the purposes set forth.

9. An automatic weighing attachment for scales consisting of a hopper terminating at its lower end in two diverging chutes, and said hopper having a contracted portion between it and said chutes, a rocking valve adapted to alternately open and close the passage-way from said contracted portion of the hopper to the chutes, means for limiting the movement of said valve to either side of said contracted portion of the hopper, a cross-bar connected with said valve and adapted to rock with the same, two levers, and a connecting member between one arm of each of said levers and an arm of the cross-bar, and said members having means at the connection with the cross-bar for permitting play one with the other, and the arm of said levers connected respectively with balance-beams of two scales, all as and for the purposes set forth.

10. In combination with a plurality of weighing-scales, an automatic attachment consisting of a hopper terminating at its lower end in a plurality of diverging chutes, a rocking valve adapted to alternately open and close the inlets of said chutes, a rocking bar connected with said valve and arranged to rock with the same, levers respectively having one arm connected with the rock-bar, and the other arm of said respective levers connected with the balance-beam of a scale, whereby the raising of an arm of the rock-bar to move the valve to open the inlet of the chute corresponding with said arm, and the depression of one arm of the rock-bar by the receiver connection will move the valve to close the inlet of the corresponding chute.

11. An automatic attachment for weighing-scales, consisting of a chute, a rocking valve adapted to alternately open and close said chute, a rock-bar connected with said valve and arranged to rock with the same, a lever, a connecting-rod between one arm of the lever and said bar, and said rod having a slot through which the arm of said bar passes for permitting play between said bar and rod, and the other arm of the lever connected with the balance-beam of a scale, and said connecting-rod made in two parts connected by an adjusting-turnbuckle, all as and for the purposes set forth.

In testimony whereof I have signed my name to this specification in the presence of two subscribing witnesses.

THOMAS ROMER WEYANT.

Witnesses:
PENNINGTON HALSTED,
EDWIN SEGER.